(12) United States Patent
Gong et al.

(10) Patent No.: US 11,588,974 B2
(45) Date of Patent: Feb. 21, 2023

(54) ZOOMING METHOD FOR IMAGING DEVICE, AND IMAGE PROCESSING METHOD AND IMAGING DEVICE

(71) Applicant: Hangzhou Hikvision Digital Technology Co., Ltd., Hangzhou (CN)

(72) Inventors: Qi Gong, Hangzhou (CN); Weimin Ma, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/424,437

(22) PCT Filed: Mar. 17, 2020

(86) PCT No.: PCT/CN2020/079629
§ 371 (c)(1),
(2) Date: Jul. 20, 2021

(87) PCT Pub. No.: WO2020/187197
PCT Pub. Date: Sep. 24, 2020

(65) Prior Publication Data
US 2022/0094854 A1    Mar. 24, 2022

(30) Foreign Application Priority Data
Mar. 19, 2019    (CN) .......................... 201910206978.6

(51) Int. Cl.
*H04N 5/232*  (2006.01)
*H04N 5/262*  (2006.01)
*H04N 5/225*  (2006.01)

(52) U.S. Cl.
CPC ..... *H04N 5/23296* (2013.01); *H04N 5/23235* (2013.01)

(58) Field of Classification Search
CPC ....................... H04N 5/23296; H04N 5/23235
See application file for complete search history.

(56) References Cited

U.S. PATENT DOCUMENTS

| | | | |
|---|---|---|---|
| 2006/0114341 A1* | 6/2006 | Morinaga | ........ H04N 5/232935 348/240.1 |
| 2012/0099004 A1 | 4/2012 | Shibuno | |

(Continued)

FOREIGN PATENT DOCUMENTS

| | | |
|---|---|---|
| CN | 101018299 | 8/2007 |
| CN | 102318354 | 1/2012 |

(Continued)

OTHER PUBLICATIONS

International Search Report and Written Opinion issued in Corresponding PCT Application No. PCT/CN2020/079629, dated Jun. 10, 2020 (English Translation provided).

*Primary Examiner* — Christopher K Peterson
(74) *Attorney, Agent, or Firm* — Norton Rose Fulbright US LLP

(57) ABSTRACT

A zoom method, an image processing method of an imaging device and imaging device are disclosed. The zoom method includes: detecting, when determining to zoom, whether a zoom position of the imaging device is currently in a preset optical zoom area or a preset digital zoom area; compressing, if the zoom position of the imaging device is in the preset optical zoom area and a first image containing a specified target is collected by the image sensor, the first image into a second image, and outputting the second image; selecting, if the zoom position of the imaging device is in the preset optical zoom area, a target sensing area from a sensing area of the imaging sensor according, and cropping a third image collected by the image sensor according to the target sensing area to obtain a fourth image and outputting the fourth image.

16 Claims, 5 Drawing Sheets

(56) References Cited

U.S. PATENT DOCUMENTS

2014/0340538 A1* 11/2014 Muukki ............... H04N 1/2112
                                                                                 348/218.1
2017/0113664 A1* 4/2017 Nix ..................... B60T 8/241

FOREIGN PATENT DOCUMENTS

| | | |
|---|---|---|
| CN | 102404506 | 4/2012 |
| CN | 102625037 | 8/2012 |
| CN | 103167235 | 6/2013 |
| CN | 103369239 | 10/2013 |
| CN | 103546686 | 1/2014 |
| CN | 103918251 | 7/2014 |
| CN | 103973972 | 8/2014 |
| CN | 106341593 | 1/2017 |
| CN | 106791483 | 5/2017 |
| CN | 108141537 | 6/2018 |
| JP | 2006128780 | 5/2006 |
| JP | 2012191463 | 10/2012 |

* cited by examiner

| Zoom mode | X(factor) | H(horizonal angle of view) |
|---|---|---|
| optical zoom | 1 | H1 |
| | 2 | H2 |
| | 3 | H3 |
| | 4 | H4 |
| | ... | ... |
| | N | Hn |
| digital zoom | n+1 | H(n+1) |
| | ... | ... |
| | n+m | H(n+m) |

ZOOMING METHOD FOR IMAGING DEVICE, AND IMAGE PROCESSING METHOD AND IMAGING DEVICE

CROSS REFERENCE TO RELATED APPLICATIONS

The present application is a national phase application under 35 U.S.C. § 371 of International Application No. PCT/CN2020/079629, filed Mar. 17, 2020, which claims the benefit of priority to Chinese patent application No. 201910206978.6 filed with the China National Intellectual Property Administration on Mar. 19, 2019 and entitled "Zoom method and apparatus for an imaging device and imaging device", each of which are incorporated herein by reference in their entirety.

TECHNICAL FIELD

The present application relates to the field of imaging technology, and in particular to a zoom method of an imaging device, an image processing method and an imaging device.

BACKGROUND

At present, for improved zoom effect of the imaging device, a digital zoom is added after the maximum optical zoom of imaging device is reached. For example, the imaging device is a zoom camera or other devices capable of zooming.

The so-called digital zoom is to crop an image obtained by an image sensor to achieve the zoom effect, that is, to crop an original image according to certain rules, and then to increase the areas of pixels in the cropped image through a corresponding image processing algorithm. In this way, the area of each pixel is increased to the size of the area of multiple pixel points in the original image, so that the resolution of the cropped image can reach the same resolution as the original image. This is similar to the image magnification by a common image processing software. Although the resolution remains unchanged, the quality and details of the image have been continuously reduced and damaged. As such, the output image will be blurred and distorted upon a certain zoom factor.

SUMMARY

In view of this, according to a first aspect of the embodiments of the present application, a zoom method of an imaging device is provided. The method is applied to the imaging device and includes:

detecting, when determining to zoom, whether a zoom position of the imaging device is currently in a preset optical zoom area or a preset digital zoom area;

adjusting, if the zoom position of the imaging device is in the preset optical zoom area, a focal length of a zoom lens on the imaging device, so that an image sensor on the imaging device captures a first image including a specified target, compresses the first image into a second image, and outputs the second image, wherein field-of-view information of the second image is the same as field-of-view information of the first image, and a second resolution of the second image is smaller than a first resolution of the first image; and selecting, if the zoom position of the imaging device is in the preset digital zoom area, a target sensing area from a sensing area of the imaging sensor according to the zoom position, cropping a third image captured by the image sensor according to the target sensing area to obtain a fourth image and outputting the fourth image, wherein a fourth resolution of the fourth image corresponds to the target sensing area, and is smaller than a third resolution of the third image, and field-of-view information of the fourth image is smaller than field-of-view information of the third image.

According to a second aspect of the embodiments of the present application, an imaging device is provided, which includes: an imaging part and a displaying part. The displaying part is configured for displaying an image output by the imaging part. The imaging part includes an image sensor, a lens, a processor and a memory for storing instructions executable by the processor;

wherein the processor is configured for:

detecting, when determining to zoom, whether a zoom position of the imaging device is currently in a preset optical zoom area or a preset digital zoom area;

adjusting, if the zoom position of the imaging device is in the preset optical zoom area, a focal length of a zoom lens on the imaging device, so that an image sensor on the imaging device captures a first image including a specified target, compresses the first image into a second image, and outputs the second image, wherein field-of-view information of the second image is the same as field-of-view information of the first image, and a second resolution of the second image is smaller than a first resolution of the first image; and selecting, if the zoom position of the imaging device is in the preset digital zoom area, a target sensing area from a sensing area of the imaging sensor according to the zoom position, cropping a third image captured by the image sensor according to the target sensing area to obtain a fourth image and outputting the fourth image, wherein a fourth resolution of the fourth image corresponds to the target sensing area, and is smaller than a third resolution of the third image, and field-of-view information of the fourth image is smaller than field-of-view information of the third image.

According to a third aspect of the embodiments of the present application, an image processing method for a zooming imaging device is provided. The imaging device supports optical zoom in a first focal range and digital zoom in a second focal range. The second focal range is greater than the first focal range, so that the imaging device has a zoom range from a minimum value of the first focal range to a maximum value of the second focal range, and the method comprises:

acquiring an external input focal length control command, and obtaining a zoom direction, a zoom speed, and a specified focal length indicated by the focal length control command;

controlling the imaging device to zoom according to the zoom direction and the zoom speed, so that the imaging device reaches the specified focal length;

calculating, when determining that the current focal length of the imaging device shifts from the first focal range to the second focal range in the process of controlling the imaging device to reach the specified focal length, an angle of view of the imaging device at the current focal length;

determining, according to the angle of view of the current focal length and a preset image size, a horizontal size and a longitudinal size for an image output by the imaging device at the current focal length, so that all the images output by the imaging device in the zoom range have the same size; and cropping, according to the determined horizontal size and longitudinal size, the image generated by the imaging device at the current focal length, and outputting the cropped image.

According to a fourth aspect of the embodiments of the present application, it is provided an imaging device, which includes: an imaging part and a displaying part, the displaying part is configured for displaying an image output by the imaging part. The imaging part includes an image sensor, a lens, a processor and a memory for storing instructions executable by the processor;

wherein, the processor is configured for executing any of the method steps in the third aspect.

The technical solutions provided by the embodiments of the present application may achieve the following beneficial effects. A zoom method of an imaging device and the imaging device as designed in the present application provided an improved image processing method in the optical zoom and digital zoom process. As a result, the digital zoom process has the same visual effect as the optical zoom, which enhances the capturing effect of the imaging device and improves the user experience.

It should be understood that the above general description and the following detailed description are only exemplary and explanatory, and cannot limit the present application.

DETAILED DESCRIPTION

Figure 1:
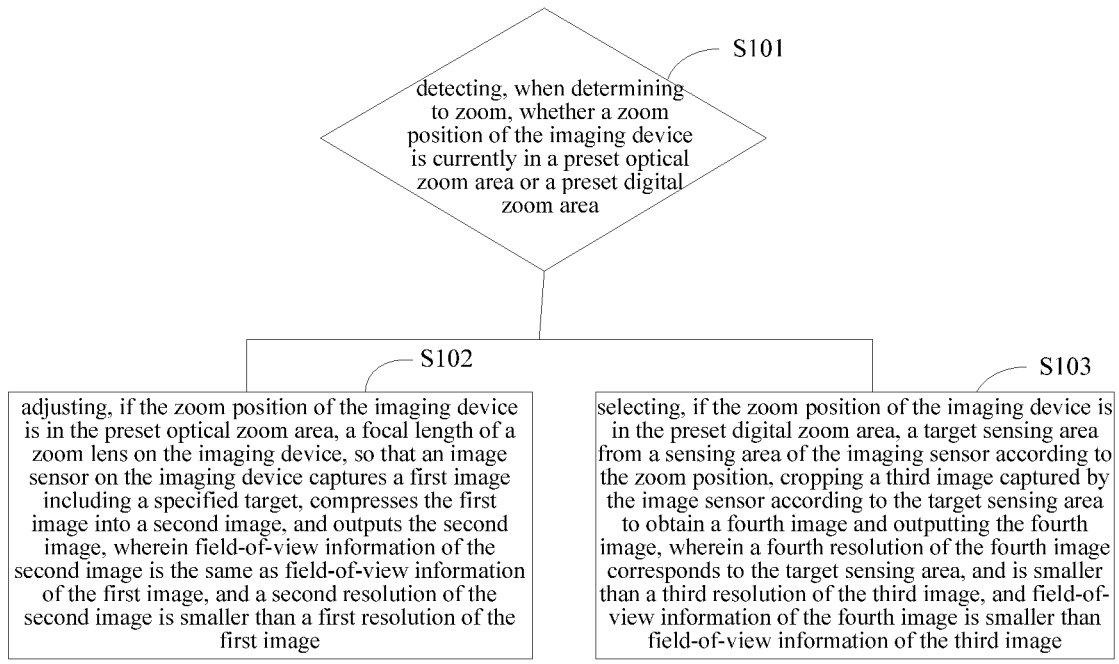
FIG. 1 is a flow diagram of a zoom method of an imaging device shown in an exemplary embodiment of the present application.

The application will be described in detail below in conjunction with the specific implementations shown in the drawings. However, these implementations do not limit the present application, and the structural, method, or functional changes made by those skilled in the art according to these implementations are all included in the protection scope of the present application.

The terms used in the present application are only for the purpose of describing specific embodiments, rather than limiting the present application. The singular forms of "a", "said" and "the" used in this application and claims are also intended to include plural forms, unless the context clearly indicates other meanings. It should also be understood that the term "and/or" as used herein refers to any or all possible combinations of one or more associated listed items.

Hereinafter, some implementations of the present application will be described in detail with reference to the accompanying drawings. In the case of no conflict, the following embodiments and the features in the embodiments can be combined with each other. The zoom method of the imaging device of the present application is mainly applied to a zooming and focusing imaging device. In addition, the solution can also be used for a fixed-focus imaging device. In summary, embodiments are not limited in aspect of specific lens type. For the completeness of the solution described in the present application, embodiments are described in detail with reference to a zooming and focusing imaging device.

As shown in FIG. 1, a zoom method of an imaging device shown in the embodiment of the present application includes:

S101, detecting, when determining to zoom, whether a zoom position of the imaging device is currently in a preset optical zoom area or a preset digital zoom area.

In the embodiment, during the capturing process of the imaging device, before the image is captured, the imaging device needs to be zoomed in advance to ensure that the captured image is clear. When the imaging device receives a zoom operation instruction, the imaging device determine to zoom according to the zoom operation instruction. In an embodiment, when an external zoom operation instruction is received, it is determined to perform zooming. The external zoom operation instruction may be issued by a third party control device communicatively connected with the imaging device.

In another embodiment, when the imaging device detects a zoom triggering event, it is determined to perform zooming. The zoom trigger event may include manual operation execution by the user or automatic trigger execution within a preset time. Of course, the imaging device may also determine to zoom when both an external zoom operation instruction is received and a zoom trigger event is detected.

The zoom operation instruction is mainly used to obtain information for controlling the imaging device, such as the speed and direction of the zoom, which are used in optical zoom or digital zoom. In other words, the zoom operation instruction may include information for controlling the imaging device, such as the speed and direction of the zoom, which will be used in optical zoom or digital zoom.

When the imaging device determines to zoom, it can detect whether the zoom position of the imaging device is currently in a preset optical zoom area or a preset digital zoom area according to the zoom operation instruction. Specifically, the zoom position of the imaging device (i.e., a required zoom factor) can be calculated through information such as the zoom speed and direction, so as to determine whether to perform optical zoom or digital zoom according to the zoom factor required by the imaging device. For example, after determining that the zoom factor indicated by the zoom operation instruction is received, if the zoom factor is within a range of the optical zoom, then an optical zoom operation needs to be performed; if the zoom factor is not within the range of the optical zoom, then a digital zoom needs to be performed.

S102, adjusting, if the zoom position of the imaging device is in the preset optical zoom area, a focal length of a zoom lens on the imaging device, so that an image sensor on the imaging device captures a first image including a specified target, compresses the first image into a second image, and outputs the second image, wherein field-of-view information of the second image is the same as field-of-view information of the first image, and a second resolution of the second image is smaller than a first resolution of the first image.

In this embodiment, when the zoom position of the imaging device is in a preset optical zoom area, the imaging device performs an optical zoom operation. When the optical zoom operation is performed, the focal length of the zoom lens of the imaging device is adjusted so that the image sensor of the imaging device captures a first image including the specified target.

When adjusting the focal length of the zoom lens on the imaging device, the method further includes: searching, in established correspondence between zoom positions and focus positions, for a target focus position corresponding to a current zoom position of the imaging device, and adjusting a focus position of the imaging device to the target focus position so that the first image captured by the image sensor is clear.

Figure 5:
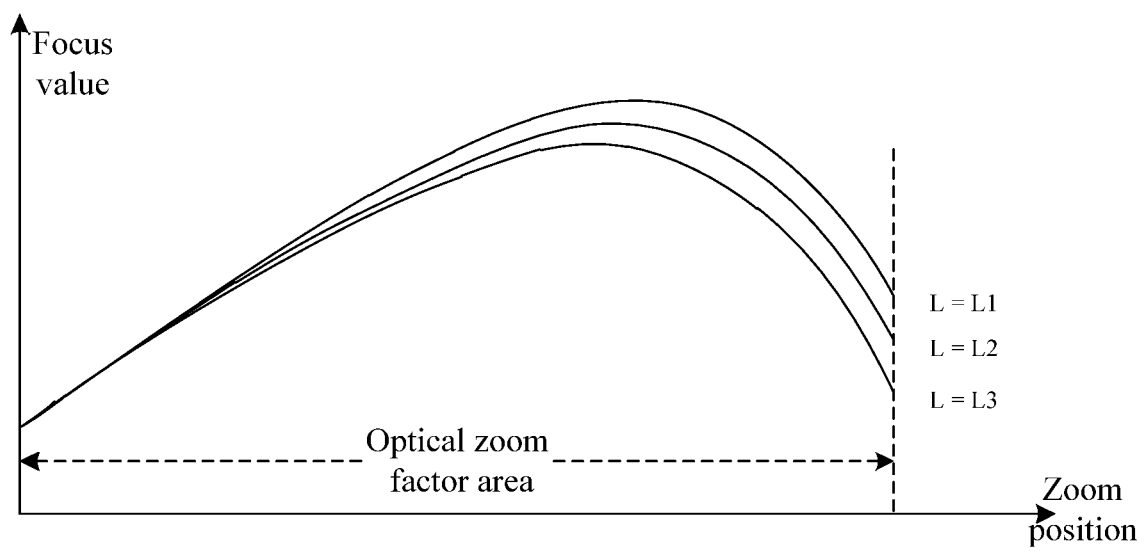
FIG. 5 is a schematic diagram illustrating focus values as a function of zoom position of an imaging device shown in an exemplary embodiment of the present application.

Specifically, as shown in FIG. 5, FIG. 5 is a zoom and focus control curve of a zoom imaging device. The meaning of this figure is introduced below. The abscissa is the zoom position of the camera, the ordinate is the focus position of the camera, that is, the focal length value. L is a curve depicting zoom positions and corresponding focus values at a certain object distance.

As shown in FIG. 5, different zoom positions at various object distances have corresponding focus positions. Therefore, a zoom operation from A to B corresponds to a movement on the L (L1, L2, L3) curve. A and B are different zoom positions, and L1, L2, and L3 are graphs shown relationship between zoom positions and focus values corresponding to different object distances. In other words, for an object distance of L1, during the zoom from zoom position A to zoom position B, the zoom position and the focus value change according to the curve L1; for an object distance of L2, during the zoom from zoom position A to zoom position B, the zoom position and the focus value change according to the curve L2; for an object distance of L3, during the zoom operation from zoom position A to zoom position B, the zoom position and the focus value change according to the curve L3.

It should be noted that during the zoom operation of some cameras that support the zooming process, the relationship between the zoom position and the focus value may switch between L1, L2 and L3. The specific switching principles are adjusted according to current camera parameters of different cameras.

Then the first image is compressed into a second image and the second image is output, wherein the field-of-view information of the second image is the same as the field-of-view information of the first image, and the second resolution of the second image is smaller than the first resolution of the first image. In this embodiment, compressing the first image into the second image specifically includes: compressing, without changing the size of the image, the first image of the first resolution into the second image of the second resolution by using a pre-specified image reduction algorithm. Wherein, the second resolution is an image resolution supported by the imaging device.

A high-resolution image sensor is used in the imaging process. The first image with high-resolution is captured by the image sensor, and then the second image with low-resolution is output through a corresponding image reduction algorithm, wherein the resolution of the second image can be the resolution required by a user for surveillance.

The field-of-view information of the second image is the same as the field-of-view information of the first image, that is, the size of the second image is the same as the first image. For example, an image sensor with 8,000,000 pixels and size of X*Y mm can output an original image (i.e., the first image) of 8,000,000 pixels. However, the image that needs to be output (i.e., the second image) in this embodiment is a pixel image of 2,000,000 pixels. In addition, the sizes of the images correspond to the size of X*Y mm of the image sensor, that is, the angle of view of an output image of 2,000,000 pixels is the same as that of 8,000,000 pixels.

Figure 3:
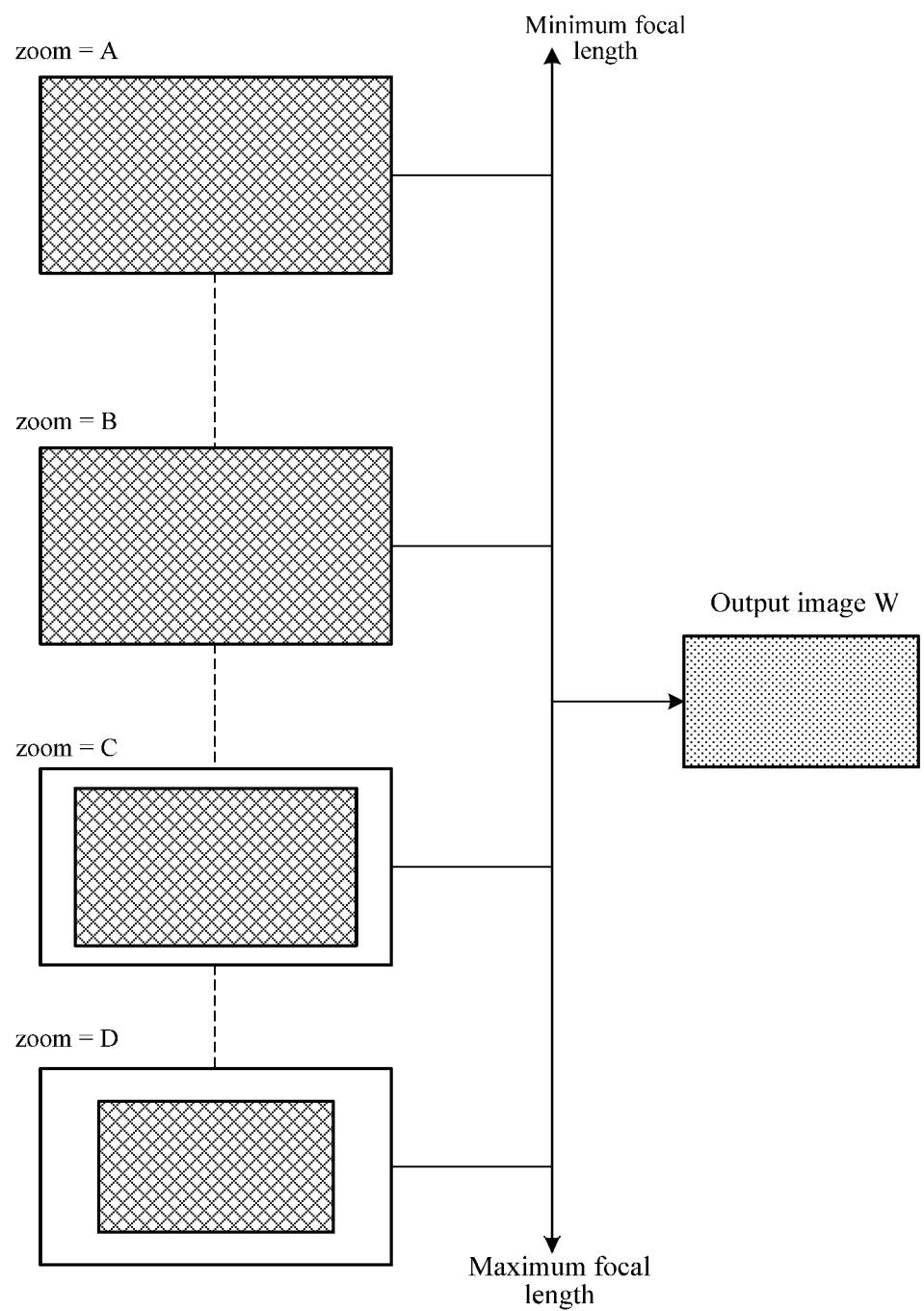
FIG. 3 is a schematic diagram of zoom control of an imaging device shown in an exemplary embodiment of the present application.

When performing an optical zoom operation, the zoom position of the lens is moved from zoom position A to zoom position B in FIG. 3 to maximize the optical zoom factor, that is, the optical zoom factor has a zoom operation area from A to B. The zoom position A (zoom=A) in the figure corresponds to the minimum zoom factor, which is the minimum zoom factor of the optical zoom, and the zoom position B (zoom=B) in the figure corresponds to the maximum zoom factor of the optical zoom area of the imaging device and is also the minimum zoom factor of the digital zoom of the imaging device, and the zoom position D (zoom=D) corresponds to the maximum zoom factor of the digital zoom area of the imaging device, that is, the area from B to C to D is the digital zoom area.

During the zoom operation of moving zoom position A to zoom position B of the camera, an image reduction algorithm needs to be executed so that the second image output is an image with low-resolution, that is, an image with high-resolution output by the image sensor is compressed into an output image W with low-resolution (i.e., the second image) as shown in FIG. 3, without affecting the overall quality and clarity of the output image. There are many specific image reduction algorithms at present, by way of example and not limitation, uniform sampling algorithm, equal interval sampling algorithm known in the art.

S103, selecting, if the zoom position of the imaging device is in the preset digital zoom area, a target sensing area from a sensing area of the imaging sensor according to the zoom position, cropping a third image captured by the image sensor according to the target sensing area to obtain a fourth image and outputting the fourth image, wherein a fourth resolution of the fourth image corresponds to the target sensing area, and is smaller than a third resolution of the third image, and field-of-view information of the fourth image is smaller than field-of-view information of the third image. The fourth resolution of the fourth image corresponds to the target sensing area.

In this embodiment, the image sensor of the present application uses an image sensor with high-resolution, the third image is an image with high-resolution, and the target sensing area selected during the digital zoom operation is that of the third image with high-resolution. The fourth image is a result of cropping the third image and increasing the area of each pixel in a cropped area. The size of the cropped area on the third image corresponds to the digital zoom factor. The higher the digital zoom factor, the smaller the cropped area on the third image; the lower the digital zoom factor, the larger the cropped area on the third image.

The fourth resolution is greater than or equal to the image resolution of an image output by the imaging device, so as to ensure that the resolution of the image output by the digital zoom at the maximum zoom factor is still high. This ensures that the stability of image during the optical zoom and the digital zoom, meets the requirements for the continuity of the angle of view during the digital zoom process and the optical zoom process, and allows the clarity of the output image throughout the digital zoom process.

For example, as shown in FIG. 3, the entire digital zoom area is output after cropping the original image captured by the image sensor, and the resolution of the fourth image corresponding to the maximum zoom factor D is not less than that of the output image W. Since the image captured by the original image sensor is an image with high-resolution, even if the area of pixel points of the cropped image is increased, it can be ensured that the image details of the fourth image of increased size are still clear. This guarantees the image resolution corresponding to the maximum zoom factor is still greater than or equal to the resolution of the output image, so as to avoid the problem of blur and distortion of the output image.

In the present application, selecting a target sensing area from a sensing area of the image sensor according to the zoom position comprises: determining, according to a current zoom position of the imaging device, target field-of-view information corresponding to the zoom position; and selecting, according to the target field-of-view information, a target sensing area from a sensing area of the image sensor.

Determining, according to a current zoom position of the imaging device, target field-of-view information corresponding to the zoom position comprises: searching, in established correspondence between zoom positions and filed-of-view information, for field-of-view information corresponding to the current zoom position of the imaging device; and determining the found field-of-view information as the target field-of-view information.

Figures 6, 7:
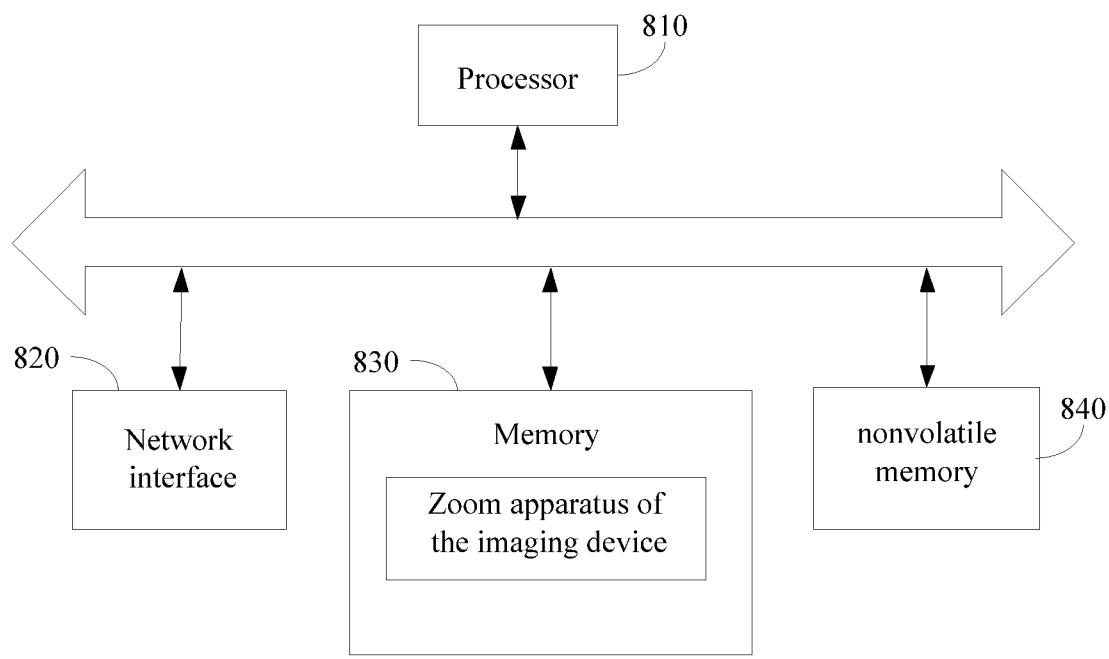
FIG. 6 is a schematic diagram of a relationship between factor and angle of view in an optical zoom and a digital zoom of an imaging device shown in an exemplary embodiment of the present application.
FIG. 7 is a structural block diagram of an imaging device shown in an exemplary embodiment of the present application.

In order to meet the stability of the zoom, the angle of view information of the digital zoom area can be obtained by fitting according to the law of the variation of the angle of view of the optical zoom area, as shown in FIG. 6. FIG. 6 is a table of horizontal field-of-view information corresponding to zoom factors obtained by fitting according to the law of the variation of the angles of view of the optical zoom area. The table may be stored in the imaging device in advance. The horizontal field-of-view information corresponding to the current zoom position of the imaging device can be found in the table in FIG. 6, wherein the factor in the table shown in FIG. 6 is the zoom factor. For example, when the zoom factor M is 3, it can be determined that the horizontal angle of view H is H3 according to the table.

Wherein, selecting, according to the target field-of-view information, a target sensing area from a sensing area of the image sensor comprises: determining, according to the target field-of-view information, horizontal pixel values corresponding to the sensing area of the image sensor; determining, according to a specified image crop ratio and the horizontal pixel values, longitudinal pixel values corresponding to the sensing area of the image sensor; and determining an area composed of the horizontal pixel values and the longitudinal pixel values as the target sensing area.

Specifically, each digital zoom factor corresponds to an angle of view value. The angle of view value can be determined from FIG. 6, and then the crop size of the third image captured by the image sensor can be calculated according to the determined angle of view value. Wherein, it can be seen from the schematic diagram of the angle of view of the optical zoom shown in FIG. 4, the calculation formula of the angle of view is: $\alpha=2*\arctan(h/2F)$ Wherein a is the angle of view value, h is a physical distance corresponding to the horizontal pixels of the image captured by the image sensor, it can be indicated by h=horizontal pixels in FIG. 4, F is a current focal length of the imaging device, in digital zoom, F is the maximum focal length in the optical zoom.

In this way, the current angle of view value of the imaging device can be determined according to the table shown in FIG. 6, and the physical distance h corresponding to the horizontal pixels of the image captured by the image sensor can be calculated according to the formula $\alpha=2*\arctan(h/2F)$.

Then, the physical distance V corresponding to the longitudinal pixel values of the image captured by the image sensor can be calculated according to the preset image crop ratio, it can be indicated by V=longitudinal pixels, specifically, h/V=ratio, where ratio is a preset crop ratio of for images.

In this way, the size of h and V of the crop area corresponding to each zoom factor in the digital zoom operation can be obtained, that is, the size of the target sensing area can be obtained. Furthermore, the imaging device can crop the captured image according to the calculated h and V to obtain an output image, and output the output image.

In order to ensure the stability of the image from optical zoom to digital zoom or from digital zoom to optical zoom, the variation of angle of view during the digital zoom still needs to consistent with the variation of angle of view during the optical zoom. Therefore, fitting the angle of view information of the digital zoom area according to the law of variation of the angle of view of the optical zoom area can ensure that the angle of view setting of the optical zoom and digital zoom in the embodiment of the present application can vary uniformly, so that the ratio of the image zoom in and zoom out during the switching between optical zoom and digital zoom can be smoothly controlled.

A zoom method of an imaging device and the imaging device is designed in the present application, and the improved image processing method in the optical zoom and digital zoom process allows the digital zoom process to have the same visual effect as the optical zoom, which avoids the problem of blur and distortion of image caused by the existing digital zoom and enhances the shooting effect of the imaging device and improves the user experience.

Figure 2:
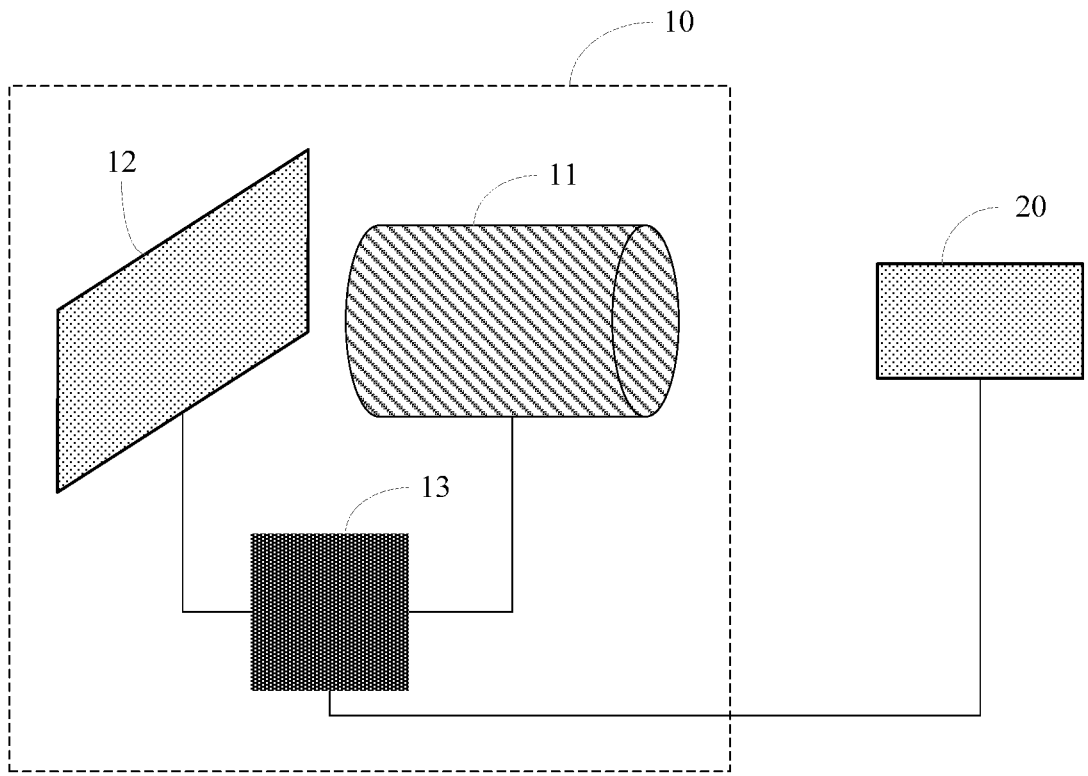
FIG. 2 is a schematic diagram of a hardware structure of an imaging device shown in an exemplary embodiment of the present application.

As shown in FIG. 2, an imaging device including an imaging part 10 and a display part 20 is also provided according to another aspect of an embodiment of the present application. The display part 20 is configured for displaying an image output by the imaging part 10, the imaging part 10 includes an image sensor 12, a lens 11, a processor 13 and a memory (not shown in FIG. 2) for storing instructions executable by the processor.

wherein the processor 13 is configured for:

detecting, when determining to zoom, whether a zoom position of the imaging device is currently in a preset optical zoom area or a preset digital zoom area;

adjusting, if the zoom position of the imaging device is in the preset optical zoom area, a focal length of a zoom lens on the imaging device, so that an image sensor on the imaging device captures a first image including a specified target, compresses the first image into a second image, and outputs the second image, wherein field-of-view information of the second image is the same as field-of-view information of the first image, and a second resolution of the second image is smaller than a first resolution of the first image; and selecting, if the zoom position of the imaging device is in the preset digital zoom area, a target sensing area from a sensing area of the imaging sensor according to the zoom position, cropping a third image captured by the image sensor according to the target sensing area to obtain a fourth image and outputting the fourth image, wherein a fourth resolution of the fourth image corresponds to the target sensing area, and is smaller than a third resolution of the third image, and field-of-view information of the fourth image is smaller than field-of-view information of the third image.

FIG. 7 is a structural block diagram of an imaging device according to an exemplary embodiment of the present application. In addition to the processor 810, memory 830, network interface 820, and non-volatile memory 840 shown in FIG. 7. The imaging device may also include, depending on required capability in practice, other hardware, such as an image sensor, a lens, etc., which will not be described in detail.

The memory 830 may store a computer program for executing the zoom method of the imaging device provided in the embodiment of the present application, that is, the zoom device of the imaging device in FIG. 7.

Figure 8:
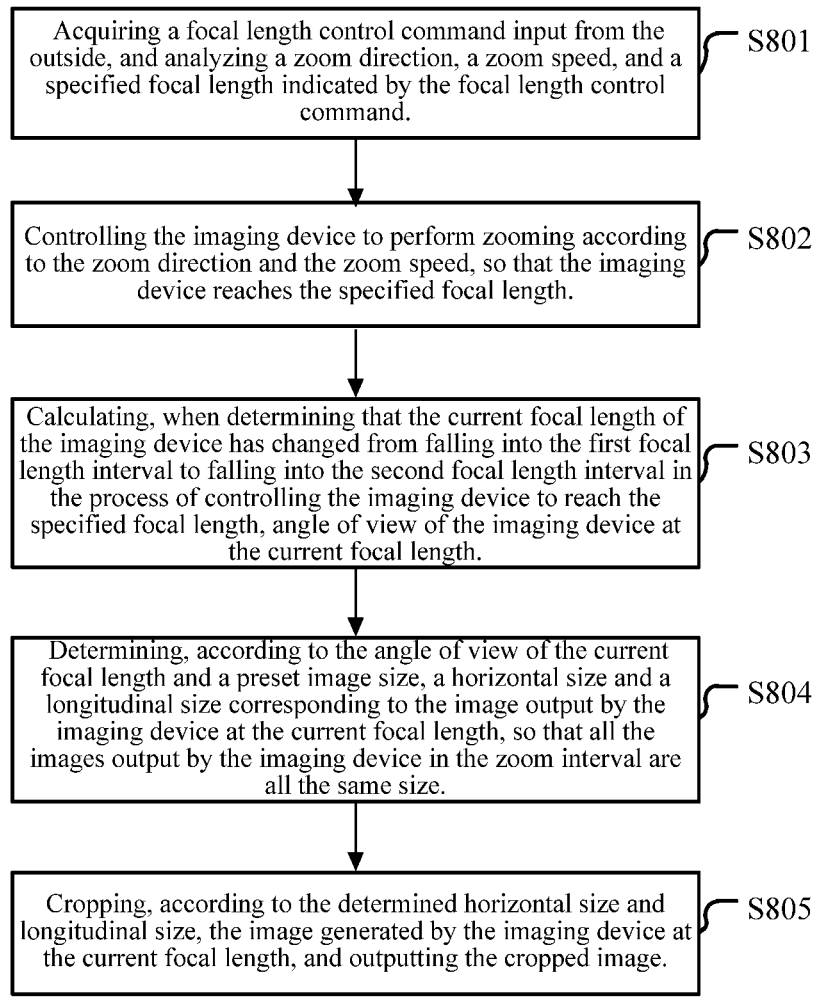
FIG. 8 is a flow diagram of an image processing method for a zooming imaging device shown in an exemplary embodiment of the present application.

As shown in FIG. 8, according to another aspect of the embodiments of the present application, an image processing method for a zoom imaging device is also provided.

The imaging device supports optical zoom in a first focal range and digital zoom in a second focal range, wherein the second focal range is greater than the first focal range, so that the imaging device has a zoom range from a minimum value of the first focal range to a maximum value of the second focal range, and the method comprises:

S801, acquiring an external input focal length control command, and obtaining a zoom direction, a zoom speed, and a specified focal length indicated by the focal length control command;

S802, controlling the imaging device to zoom according to the zoom direction and the zoom speed, so that the imaging device reaches the specified focal length;

S803, calculating, when determining that the current focal length of the imaging device shifts from the first focal range to the second focal range in the process of controlling the imaging device to reach the specified focal length, an angle of view of the imaging device at the current focal length;

S804, determining, according to the angle of view of the current focal length and a preset image size, a horizontal size and a longitudinal size for an image output by the imaging device at the current focal length, so that all the images output by the imaging device in the zoom range have the same size; and S805, cropping, according to the determined horizontal size and longitudinal size, the image generated by the imaging device at the current focal length, and outputting the cropped image.

It can be seen from the technical solutions provided by the embodiments of the present application, an improved image processing method in the optical zoom and digital zoom process allows the digital zoom process to have the same visual effect of the optical zoom, which enhances the shooting effect of the imaging device and improves the user experience.

In the embodiment of the present application, the imaging device supports optical zoom in a first focal range and digital zoom in a second focal range, wherein the second focal range is greater than the first focal range, so that the imaging device has a zoom range from a minimum value of the first focal range to a maximum value of the second focal range. For example, when performing an optical zoom operation, the zoom position of the lens is moved from zoom position A to zoom position B in FIG. 3 to maximize the optical zoom factor, that is, the optical zoom factor has a zoom operation area from A to B.

The zoom position A (zoom=A) in the figure is the minimum zoom factor, which is the minimum zoom factor of the optical zoom, and the zoom position B (zoom=B) in the figure is the maximum zoom factor of the optical zoom area of the imaging device and is also the minimum zoom factor of the digital zoom of the imaging device, and the zoom position D (zoom=D) is the maximum zoom factor of the digital zoom area of the imaging device, that is, the area from B to C to D is the digital zoom area. Then the first focal range is from A to B, and the second focal range is from B to D.

During the capturing process of the imaging device, before the image is captured, the imaging device needs to be zoomed in advance to ensure that the captured image is clear. In the above step S801, when receiving an external focus length control instruction, the imaging device determines that the zoom operation needs to be performed at this time. Then the imaging device can analyze a zoom direction, a zoom speed, and a specified focal length indicated by the focus length control instruction.

Furthermore, the imaging device may perform zooming according to the zooming direction and the zooming speed to bring the imaging device to the specified focal length. That is, the imaging device may perform the above step S802. Specifically, the imaging device may determine whether to perform optical zoom or digital zoom according to the specified focal length that needs to be reached. When the specified focal length falls within the first focal length range, the optical zoom needs to be performed, and when the specified focal length falls into the second focal range, the optical zoom needs to be performed first, and then the digital zoom is performed.

In the process of the imaging device performing the zoom operation to reach the specified focal length, in case that the current focal length has switched from the first focal range to the second focal range, the imaging device is converted from optical zoom to digital zoom. In order to ensure the stability of the zoom operation and avoid the problem of blur and distortion of the output image, the imaging device can calculate the angle of view of the imaging device at the current focal length.

After calculating the angle of view of the current focal length, step S804 can be performed, that is, determining, according to the angle of view of the current focal length and a preset image size, a horizontal size and a longitudinal size for the image output by the imaging device at the current focal length, so that all the images output by the imaging device in the zoom interval have the same size.

Figure 4:
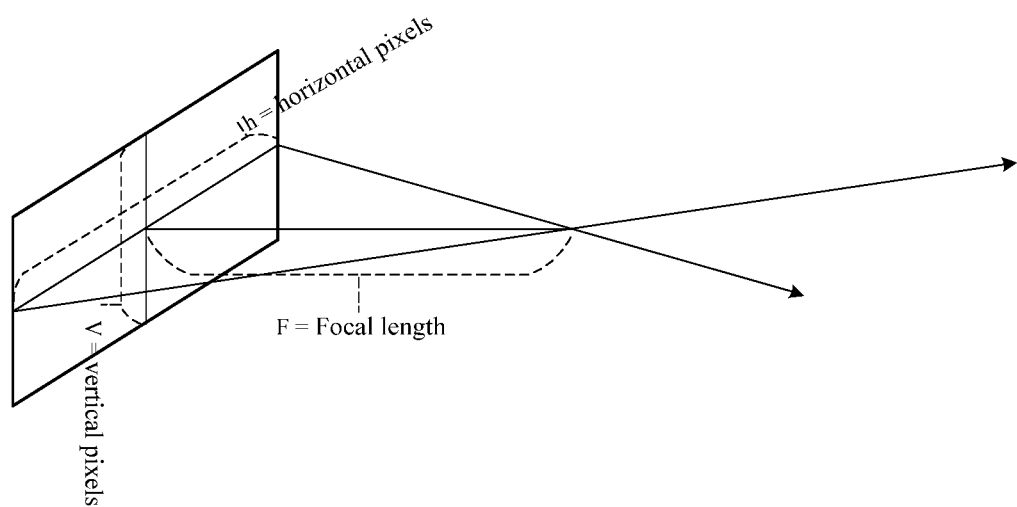
FIG. 4 is a schematic diagram of an angle of view of an optical zoom shown in an exemplary embodiment of the present application.

As shown in the schematic diagram of the angle of view of the optical zoom shown in FIG. 4, it can be seen that the horizontal size and the longitudinal size for the output image are related to the angle of view of the imaging device and the imaging focal length. Therefore, the horizontal size and longitudinal size for the image output by the imaging device at the current focal length can be determined according to the angle of view of the current focal length and a preset image size. In this way, it can be ensured that all images output by the imaging device in the entire zoom interval have the same size, which meets the needs of users.

After determining the horizontal size and the longitudinal size for the output image, the imaging device can crop the image generated by the imaging device at the current focal length according to the determined horizontal size and longitudinal size, and then output the cropped image, which is an image output by the imaging device after the zoom processing that the user needs.

As an implementation of the embodiment of the present invention, calculating the angle of view of the imaging device at the current focal length may include:

determining, according to the current focal length of the imaging device, a zoom factor of the imaging device; and searching for, in established correspondence between zoom factors and angles of view for the second focal range, an angle of view corresponding to the zoom factor of the imaging device, and taking the found angle of view as the angle of view of the imaging device at the current focal length.

In order to determine the angle of view of the imaging device at the current focal length, the zoom factor of the imaging device may be determined according to the current focal length of the imaging device. Furthermore, an angle of view corresponding to the zoom factor of the imaging device is searched for in established correspondence between zoom factors and angles of view for the second focal range, and taken as the angle of view of the imaging device at the current focal length.

In order to facilitate the determination of the angle of view of the imaging device, the correspondence between zoom factors and angles of view for the second focal range can be established in advance, that is, the correspondence between zoom factors and angles of view corresponding to the digital zoom of the imaging device. As such, in zooming, the angle of view of the imaging device at the current focal length.

It can be seen from the embodiment of the present application, the imaging device can determine a zoom factor of the imaging device according to the current focal length of the imaging device; search for, in established correspondence between zoom factors and angles of view for the second focal range, an angle of view corresponding to the zoom factor of the imaging device, and take the found angle of view as the angle of view of the imaging device at the current focal length.

As an implementation of the embodiment of the present invention, the correspondence between zoom factors and angles of view for the second focal range is established by:

determining, for the first focal range, law of variation of the zoom factor as a function of an angle of view; and obtaining, according to the law of variation, the correspondence between zoom factors and angles of view for the second focal range by fitting.

In order to meet the stability of the zooming process, the angle of view information of the digital zoom area can be fitted according to a law of variation of the angle of view of the optical zoom area. Specifically, the imaging device can determine, for the first focal range, the law of variation of the zoom factor as a function of the angle of view, that is, the law of variation of the zoom factor as a function of the angle of view angle of the imaging device during the optical zoom process, and then obtaining, according to the law of variation, the correspondence between zoom factors and angles of view for the second focal range by fitting.

For example, as shown in FIG. 6, FIG. 6 is a correspondence table of angles of view corresponding to zoom factors obtained by fitting according to the law of change the angle of view as a function of the optical zoom area. The table may be stored in the imaging device in advance. The angle of view corresponding to the current zoom position of the imaging device can be searched for in the table in FIG. 6, wherein the factor in the table shown in FIG. 6 is the zoom factor. For example, when the zoom factor M is n+1, it can be determined that the horizontal angle of view H is H(n+1) according to the table.

It can be seen that in this embodiment, a law of variation of the zoom factor as a function of an angle of view for the first focal range can be determined in advance, and then based on the law, the correspondence between zoom factors and angles of view for the second focal range can be obtained by fitting. In this way, it can be ensured that the angle of view can be changed uniformly during the switch between the optical zoom and the digital zoom in the embodiment of the present application, so that the ratio control of the image zoom in and zoom out during the switching operation between optical zoom and digital zoom is smooth, so as to ensure the stability of zoom process.

As an implementation of the embodiment of the present invention, determining, according to the angle of view of the current focal length and a preset image size, a horizontal size and a longitudinal size of an image output by the imaging device at the current focal length comprises:

calculating the horizontal size of the image output by the imaging device at the current focal length based on the angle of view of the imaging device at the current focal length and the maximum value of the first focal range; and determining, according to the preset image size and the horizontal size, the longitudinal size of the output image.

When the imaging device determines the horizontal size and longitudinal size of the image output by the imaging device at the current focal length, it can first calculate the horizontal size of the image output by the imaging device at the current focal length according to the angle of view of the imaging device at the current focal length and the maximum value of the first focal range.

In one implementation, the imaging device may calculate the horizontal size of the image output by the imaging device at the current focal length through a tangent operation based on the angle of view of the imaging device at the current focal length and the maximum value of the first focal range.

It can be seen from the schematic diagram of the angle of view of the optical zoom shown in FIG. 4, the calculation formula of the angle of view of the imaging device when capturing the image is: $\alpha = 2*\arctan(h/2F)$. Wherein a is the angle of view value, h is a physical distance corresponding to the horizontal pixels of the image captured by the image sensor, F is a focal length of the imaging device. In digital zoom, F is the maximum focal length in the optical zoom (that is, the maximum value of the first focal range).

According to the above formula, $h = 2F \tan(\alpha/2)$. Therefore, in the case that the angle of view $\alpha$ and the maximum value F of the first focal range are known, the physical distance corresponding to the horizontal pixels of the image captured by the image sensor can be calculated, that is, the horizontal size of the image that needs to output by the imaging device at the current focal length.

Furthermore, the imaging device can determine the longitudinal size of the output image according to the preset image size and the horizontal size. In one implementation, the ratio of cropped image may be taken as the preset image size. In this way, after the horizontal size corresponding to the output image is determined, the longitudinal size of the output image can be calculated.

Specifically, the imaging device can calculate the physical distance V corresponding to the longitudinal pixel value of the output image according to the formula h/V=ratio, that is, the longitudinal size of the output image.

It can be seen that in this embodiment, the imaging device can calculate the horizontal size of the image output by the imaging device at the current focal length according to the angle of view of the imaging device at the current focal length and the maximum value of the first focal range, and then determine the longitudinal size of the output image according to the preset image size and horizontal size. In this way, it can ensure that all images output by the imaging device in the zoom range have the same size, so that the visual effect in the digital zoom process is the same as that of the optical zoom, which avoids the problem of blur and distortion of image caused by the existing digital zoom and enhances the capturing effect of the imaging device and improves the user experience.

According to another aspect of the embodiments of the present application, it is provided an imaging device, which includes: an imaging part and a displaying part. The displaying part is configured for displaying an image output by the imaging part, and the imaging part includes an image sensor, a lens, a processor and a memory for storing instructions executable by the processor.

The processor is configured for executing the steps of the image processing method of a zoom imaging device described in any of the above embodiments.

It can be seen from the technical solutions provided by the embodiments of the present application, an improved image processing method in the optical zoom and digital zoom process allows the digital zoom process to have the same visual effect of the optical zoom, which enhances the capturing effect of the imaging device and improves the user experience.

Moreover, the present application may take the form of a computer program product implemented on one or more storage media (including but not limited to disk storage, CD-ROM, optical storage, etc.) including program code. A machine readable storage media includes both permanent and non-permanent, removable and non-removable media may achieve the information storage by any method or technology. The information may be computer readable instructions, data structures, modules of programs, or other data. The examples of the machine readable storage media comprises, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read only memory (CD-ROM), digital versatile disk (DVD) or other optical storage, magnetic cassette tape, magnetic tape magnetic disk storage or other magnetic storage devices or any other non-transportable media may be configured to store the information that can be accessed by a computing device.

After considering the specification and practicing the invention disclosed herein, those skilled in the art will easily think of other embodiments of the present application.

The present application is intended to cover any variations, uses, or adaptive changes of the present application. These variations, uses, or adaptive changes follow the general principles of the present application and include common knowledge or customary technical means in the technical field that are not disclosed in the present application.

The description and the embodiments are only regarded as exemplary, and the true scope and spirit of the present application are pointed out by the claims of the present application.

It should be understood that the present application is not limited to the precise structure that has been described above and shown in the drawings, and various modifications and changes can be made without departing from its scope.

The scope of the present application is only limited by the appended claims.

What is claimed is:

1. A zoom method of an imaging device, applicable to the imaging device, comprising:

detecting, when determining to zoom, whether a zoom position of the imaging device is currently in a preset optical zoom area or a preset digital zoom area;

adjusting, if the zoom position of the imaging device is in the preset optical zoom area, a focal length of a zoom lens on the imaging device, so that an image sensor on the imaging device captures a first image including a specified target, compresses the first image into a second image, and outputs the second image, wherein field-of-view information of the second image is the same as field-of-view information of the first image, and a second resolution of the second image is smaller than a first resolution of the first image; and selecting, if the zoom position of the imaging device is in the preset digital zoom area, a target sensing area from a sensing area of the imaging sensor according to the zoom position, cropping a third image captured by the image sensor according to the target sensing area and increasing the area of each pixel in a cropped area to obtain a fourth image and outputting the fourth image, wherein a fourth resolution of the fourth image corresponds to the target sensing area, and is smaller than a third resolution of the third image, and field-of-view information of the fourth image is smaller than field-of-view information of the third image, wherein the size of the cropped area on the third image corresponds to the digital zoom factor, and the fourth resolution of the fourth image corresponds to the maximum digital zoom factor, and the fourth resolution is greater than or equal to the second resolution of the second image.

2. The method of claim 1, wherein determining to zoom comprises:

determining to zoom when receiving an external zoom operation instruction; and/or, determining to zoom when the imaging device detects a zoom triggering event.

3. The method of claim 1, wherein compressing the first image into a second image comprises:

compressing, without changing the size of the image, the first image of the first resolution into the second image of the second resolution by using a pre-specified image reduction algorithm.

4. The method of claim 1, wherein when adjusting a focal length of a zoom lens on the imaging device, the method further comprises:

searching, in established correspondence between zoom positions and focus positions, for a target focus position corresponding to a current zoom position of the imaging device, and adjusting a focus position of the imaging device to the target focus position so that the first image captured by the image sensor is clear.

5. The method of claim 1, wherein selecting a target sensing area from a sensing area of the image sensor according to the zoom position comprises:

determining, according to a current zoom position of the imaging device, target field-of-view information corresponding to the zoom position; and selecting, according to the target field-of-view information, a target sensing area from a sensing area of the image sensor.

6. The method of claim 5, wherein selecting, according to the target field-of-view information, a target sensing area from a sensing area of the image sensor comprises:

determining, according to the target field-of-view information, horizontal pixel values corresponding to the sensing area of the image sensor;

determining, according to a specified image crop ratio and the horizontal pixel values, longitudinal pixel values corresponding to the sensing area of the image sensor; and determining an area composed of the horizontal pixel values and the longitudinal pixel values as the target sensing area.

7. The method of claim 5, wherein determining, according to a current zoom position of the imaging device, target field-of-view information corresponding to the zoom position comprises;

searching, in established correspondence between zoom positions and filed-of-view information, for field of view information corresponding to the current zoom position of the imaging device; and determining the found field of view information as the target field of view information.

8. An imaging device, comprising: an imaging part and a displaying part, the displaying part is configured for displaying an image output by the imaging part, and the imaging part includes an image sensor, a lens, a processor and a memory for storing instructions executable by the processor;

wherein the processor is configured for:

detecting, when determining to zoom, whether a zoom position of the imaging device is currently in a preset optical zoom area or a preset digital zoom area;

adjusting, if the zoom position of the imaging device is in the preset optical zoom area, a focal length of a zoom lens on the imaging device, so that an image sensor on the imaging device captures a first image including a specified target, compresses the first image into a second image, and outputs the second image, wherein field-of-view information of the second image is the same as field-of-view information of the first image, and a second resolution of the second image is smaller than a first resolution of the first image; and selecting, if the zoom position of the imaging device is in the preset digital zoom area, a target sensing area from a sensing area of the imaging sensor according to the zoom position, cropping a third image captured by the image sensor according to the target sensing area and increasing the area of each pixel in a cropped area to obtain a fourth image and outputting the fourth image, wherein a fourth resolution of the fourth image corresponds to the target sensing area, and is smaller than a third resolution of the third image, and field-of-view information of the fourth image is smaller than field-of-view information of the third image, wherein the size of the cropped area on the third image corresponds to the digital zoom factor, and the fourth resolution of the fourth image corresponds to the maximum digital zoom factor, and the fourth resolution is greater than or equal to the second resolution of the second image.

9. An imaging processing method for a zooming imaging device, wherein the imaging device supports optical zoom in a first focal range and digital zoom in a second focal range, wherein the second focal range is greater than the first focal range, so that the imaging device has a zoom range from a minimum value of the first focal range to a maximum value of the second focal range, and the method comprises:

acquiring an external input focal length control command, and obtaining a zoom direction, a zoom speed, and a specified focal length indicated by the focal length control command;

controlling the imaging device to zoom according to the zoom direction and the zoom speed, so that the imaging device reaches the specified focal length;

calculating, when determining that the current focal length of the imaging device shifts from the first focal range to the second focal range in the process of controlling the imaging device to reach the specified focal length, an angle of view of the imaging device at the current focal length;

determining, according to the angle of view of the current focal length and a preset image size, a horizontal size and a longitudinal size for an image output by the imaging device at the current focal length, so that all the images output by the imaging device in the zoom range have the same size; and cropping, according to the determined horizontal size and longitudinal size, the image captured by the imaging device at the current focal length, and outputting the cropped image.

10. The method of claim 9, wherein calculating an angle of view of the imaging device at the current focal length comprises:

determining, according to the current focal length of the imaging device, a zoom factor of the imaging device; and searching for, in established correspondence between zoom factors and angles of view for the second focal range, an angle of view corresponding to the zoom factor of the imaging device, and taking the found angle of view as the angle of view of the imaging device at the current focal length.

11. The method of claim 10, wherein the correspondence between zoom factors and angles of view for the second focal range is established by:

determining, for the first focal range, law of variation of the zoom factor as a function of an angle of view; and obtaining, according to the law of variation, the correspondence between zoom factors and angles of view for the second focal range by fitting.

12. The method of claim 9, wherein determining, according to the angle of view of the current focal length and a preset image size, a horizontal size and a longitudinal size of an image output by the imaging device at the current focal length comprises:

calculating the horizontal size of the image output by the imaging device at the current focal length based on the angle of view of the imaging device at the current focal length and the maximum value of the first focal range; and determining, according to the preset image size and the horizontal size, the longitudinal size of the output image.

13. The method of claim 12, wherein calculating the horizontal size of the image output by the imaging device at the current focal length based on the angle of view of the imaging device at the current focal length and the maximum value of the first focal range comprises:

calculating the horizontal size of the image output by the imaging device at the current focal length through a tangent operation based on the angle of view of the imaging device at the current focal length and the maximum value of the first focal range.

14. The method of claim 13, wherein calculating the horizontal size of the image output by the imaging device at the current focal length through a tangent operation based on the angle of view of the imaging device at the current focal length and the maximum value of the first focal range comprises:

calculating, according to a formula $\alpha=2*\arctan(h/2F)$, the horizontal size of the image output by the imaging device at the current focal length;

wherein, $\alpha$ is the angle of view of the current focal length, h is the horizontal size of the image output by the imaging device at the current focal length, and F is the maximum value of the first focal range.

15. The method of claim 12, wherein determining, according to the preset image size and the horizontal size, the vertical size of the output image comprises:

calculating, according to a formula h/V=ratio, the longitudinal size of the output image;

wherein h is the longitudinal size, V is the longitudinal size of the output image, and "ratio" is a preset image crop ratio.

16. An imaging device, comprising:

an imaging part and a displaying part, the displaying part is configured for displaying images output by the imaging part, the imaging part comprises an image sensor, a lens, a processor and a memory for storing instructions executable by the processor;

wherein, the processor is configured for executing the method of claim 9.

* * * * *